US009245275B2

(12) United States Patent
Yamada et al.

(10) Patent No.: US 9,245,275 B2
(45) Date of Patent: Jan. 26, 2016

(54) RELEVANCE ANALYSIS DEVICE, RELEVANCE ANALYSIS METHOD, AND RELEVANCE ANALYSIS PROGRAM

(75) Inventors: Hideo Yamada, Okazaki (JP); Ryuya Muramatsu, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 1075 days.

(21) Appl. No.: 13/328,330

(22) Filed: Dec. 16, 2011

(65) Prior Publication Data
US 2012/0185490 A1 Jul. 19, 2012

(30) Foreign Application Priority Data

Jan. 17, 2011 (JP) .................................. 2011-006859

(51) Int. Cl.
*G06F 17/30* (2006.01)
*G06Q 30/02* (2012.01)
*G06Q 10/10* (2012.01)

(52) U.S. Cl.
CPC .............. *G06Q 30/02* (2013.01); *G06Q 10/10* (2013.01)

(58) Field of Classification Search
CPC .............................................. G06F 17/30648
USPC ........................................................ 707/749
See application file for complete search history.

(56) References Cited

U.S. PATENT DOCUMENTS

| 7,620,636 | B2 * | 11/2009 | Fasciano ................. G06Q 10/00 |
| 7,904,511 | B2 * | 3/2011 | Ryan et al. ..................... 709/204 |
| 8,671,009 | B1 * | 3/2014 | Coley .................... G06Q 10/109 |
| | | | 705/7.13 |
| 2005/0216300 | A1 * | 9/2005 | Appelman ............. G06Q 10/10 |
| | | | 705/319 |
| 2006/0253584 | A1 * | 11/2006 | Dixon et al. .................... 709/225 |
| 2007/0214097 | A1 * | 9/2007 | Parsons et al. .................... 706/12 |
| 2008/0189274 | A1 * | 8/2008 | Mann ................. G06F 17/30864 |
| 2008/0301568 | A1 * | 12/2008 | Im et al. ......................... 715/757 |
| 2009/0119309 | A1 * | 5/2009 | Gibson ............. G06F 17/30572 |
| 2009/0300036 | A1 * | 12/2009 | Nagasaki .......... G06F 17/30038 |
| 2009/0327308 | A1 * | 12/2009 | Carter et al. ..................... 707/10 |
| 2010/0293247 | A1 * | 11/2010 | McKee et al. ................. 709/218 |
| 2011/0113056 | A1 * | 5/2011 | Ye ........................... H04L 63/08 |
| | | | 707/769 |
| 2012/0123806 | A1 * | 5/2012 | Schumann et al. ............... 705/4 |

(Continued)

FOREIGN PATENT DOCUMENTS

JP  A-2007-304977  11/2007
JP  2009-245046 A  10/2009

OTHER PUBLICATIONS

Mislove et al., Measurement and Analysis of Online Social Networks, Oct. 2007, 14 pages.*
Wilson et al., User Interactions in Social Networks and their Implications, 2009, 14 pages.*
Apr. 3, 2012 European Search Report issued in EP 11 19 4742.

(Continued)

*Primary Examiner* — Noosha Arjomandi
(74) *Attorney, Agent, or Firm* — Oliff PLC

(57) ABSTRACT

Relevance analysis devices, methods, and programs analyze a mutual relevance between a plurality of users utilizing a server that allows users to view information provided by target viewed users. The devices, methods, and programs specify an analysis reference user and an analysis target user. The devices, methods, and programs specify a route that spans between the analysis reference user and the target viewed user, and specify a mutual relevance between the analysis reference user and the analysis target user based on a number of component routes that make up the specified route and based on a number of the component routes in which an origin-side user is registered as a target viewed user by an end-side user.

20 Claims, 9 Drawing Sheets

(56) References Cited

U.S. PATENT DOCUMENTS

2012/0215773 A1* 8/2012 Si .................... G06Q 30/02
707/723
2013/0185189 A1* 7/2013 Stewart ..................... 705/38

OTHER PUBLICATIONS

Journal of the European Patent Office, vol. 30, No. 1, Nov. 1, 2007, pp. 592-593, Notice from the European Patent Office dated Oct. 1, 2007 concerning business methods.

* cited by examiner

FIG.2

[USER DATABASE]

| USER ID | VIEWING TARGET USER ID |
|---------|------------------------|
| A       | B,E,P,···              |
| B       | A,C,Q,···              |
| ⋮       | ⋮                      |

[RELEVANCE TABLE]

| ORIGIN/END | NUMBER OF COMPONENT ROUTES | REGISTRATION INDEX | RELEVANCE |
|---|---|---|---|
| AD | 3 | 5 | 8 |
| AG | 3 | 4 | 7 |

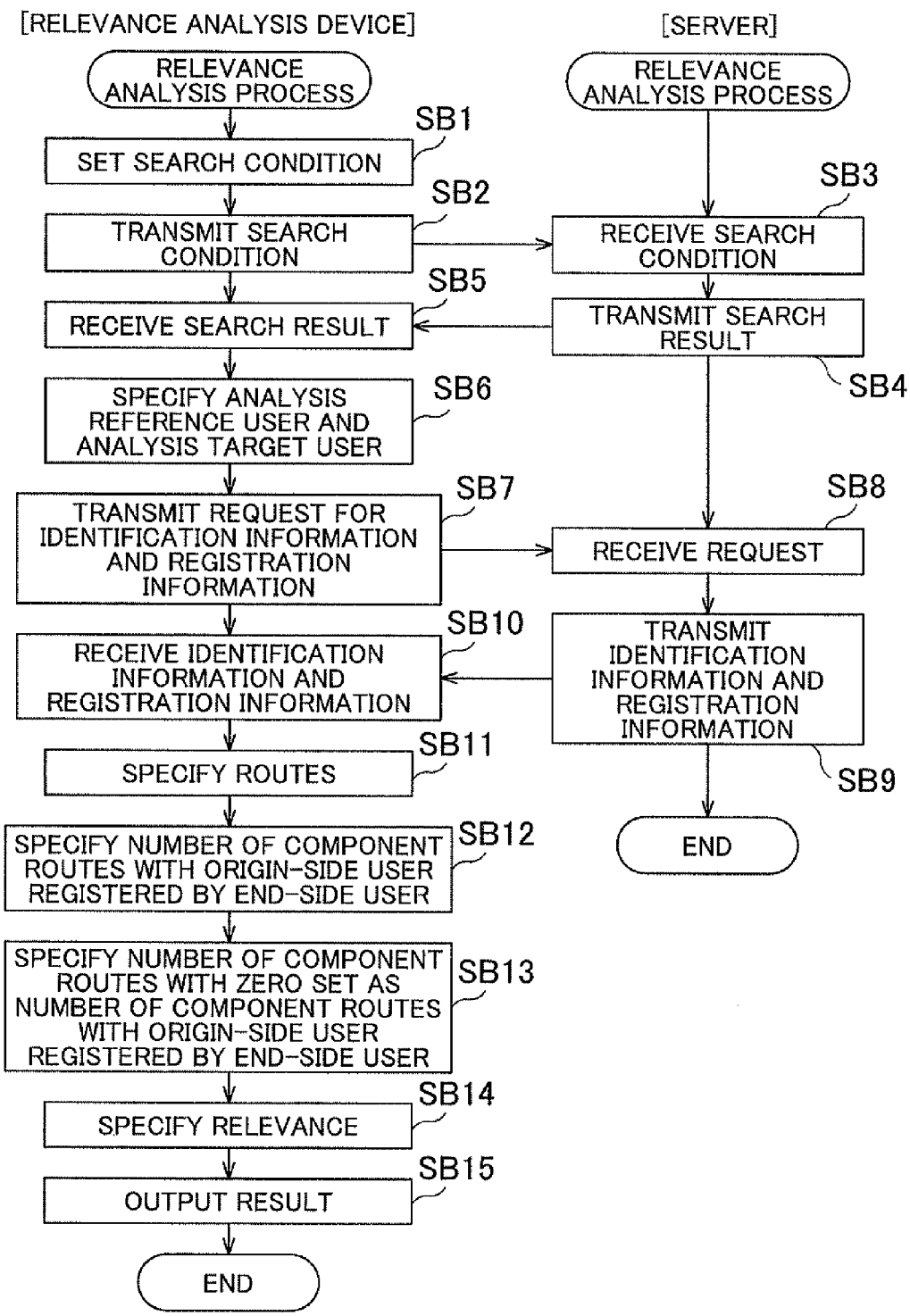

FIG. 8

[RELEVANCE TABLE]

| ORIGIN/END | NUMBER OF ORIGINAL COMPONENT ROUTES | NUMBER OF COMPONENT ROUTES AFTER RECONFIGURING ROUTE |
|---|---|---|
| AD | 3 | 2 |
| AH | 4 | 1 |

FIG. 9

[USER DATABASE]

| USER ID | VIEWING TARGET USER ID | PROVISION QUANTITY INFORMATION | |
|---|---|---|---|
| | | ADDRESSEE | PROVISION QUANTITY |
| A | B,E,P,⋯ | B | 20 |
| | | P | 15 |
| | | ⋮ | ⋮ |
| B | A,C,Q,⋯ | A | 20 |
| | | ⋮ | ⋮ |
| ⋮ | ⋮ | ⋮ | ⋮ |

[RELEVANCE TABLE]

| ORIGIN/END | NUMBER OF COMPONENT ROUTES | REGISTRATION INDEX | STATEMENT INDEX | RELEVANCE |
|---|---|---|---|---|
| AC | 2 | 3 | 0.4 | 4.6 |
| AF | 2 | 3 | 0 | 5 |

RELEVANCE ANALYSIS DEVICE, RELEVANCE ANALYSIS METHOD, AND RELEVANCE ANALYSIS PROGRAM

INCORPORATION BY REFERENCE

The disclosure of Japanese Patent Application No. 2011-006859, filed on Jan. 17, 2011, including the specification, drawings, and abstract is incorporated herein by reference in its entirety.

BACKGROUND

1. Related Technical Fields

Related technical fields include relevance analysis devices, relevance analysis methods, and relevance analysis programs.

2. Related Art

Services such as Twitter® and various types of social network services (SNSs) are now provided that allow other users to view statements posted to a server by a given user. Numerous users post a large quantity of information through these services, and it is sometimes difficult for viewers of posted information to determine which posts are reliable.

In view of this, a post information evaluation system for evaluating the reliability of posted information has been proposed. In this post information evaluation system, a client terminal for transmitting post information to a server includes a position data acquisition unit for acquiring position data. The position data acquired by the position data acquisition unit is transmitted together with the post information to the server. The server then evaluates the reliability of the post information based on the distance between a position of a facility included in the post information and a position specified by the position data transmitted together with the post information (see Japanese Patent Application Publication No. JP-A-2007-304977, for example).

SUMMARY

However, the system according to the related art as described above simply evaluates the reliability based on the distance between a position of a facility or the like specified based on the post information and a position specified by the position data transmitted together with the post information. This system gives no consideration to the relevance between the user who posted the post information and the user viewing the post information. Thus, the conventional system cannot provide material for determining whether the user who posted the post information is a user highly relevant to the user viewing the post.

Exemplary implementations of the broad inventive principles described herein provide a relevance analysis device, a relevance analysis method, and a relevance analysis program, which can suitably analyze a mutual relevance between a user who provided information to a server and another user viewing the information.

Exemplary implementations provide a relevance analysis devices, methods, and programs in which a relevance specification unit specifies a mutual relevance between an analysis reference user and an analysis target user based on a number of component routes that constitute a route having an origin that corresponds to the analysis reference user and an end that corresponds to the analysis target user, and based on whether on each component route an origin-side user is registered as a target viewed user by an end-side user. Therefore, the mutual relevance between the analysis reference user and the analysis target user can be suitably analyzed in consideration of a distance between the analysis reference user and the analysis target user in a network and the relevance of the users of the component routes that constitute the route to each other. It is thus possible to provide material for determining whether the user who provided information to the server is a user highly relevant to the user viewing the information.

According to exemplary implementations, the relevance specification unit specifies a higher mutual relevance between the analysis reference user and the analysis target user as the number of the component routes that constitute the route decreases and a number of the component routes, out of the component routes that constitute the route, with the origin-side user registered as the target viewed user by the end-side user increases. Therefore, if the users on component routes that constitute a particular route have registered each other, the high mutual relevance of such users can be incorporated into determining the mutual relevance between the analysis reference user and the analysis target user. Accordingly, relevance can be even more suitably analyzed.

According to exemplary implementations, when specifying the number of the component routes that constitute the route, the relevance specification unit specifies zero as the number of the component routes that constitute the route with the origin-side user registered as the target viewed user by the end-side user. Therefore, if the users on component routes that constitute a particular route have registered each other, the high mutual relevance of such users can be incorporated into determining the mutual relevance between the analysis reference user and the analysis target user. Accordingly, relevance can be even more suitably analyzed.

According to exemplary implementations, the relevance specification unit specifies a quantity of information provided by the origin-side user addressed to the end-side user for each of the component routes that constitute the route, and specifies the mutual relevance between the analysis reference user and the analysis target user based on the specified quantity. Therefore, if information is provided by the origin-side user addressed to the end-side user on any of the component routes that constitute the route, the high mutual relevance of such users can be incorporated into determining the mutual relevance between the analysis reference user and the analysis target user. Accordingly, relevance can be even more suitably analyzed.

BRIEF DESCRIPTION OF THE DRAWINGS

FIG. 2 is a table that illustrates information stored in a user database;

FIG. 6 is a flowchart of the relevance analysis process algorithm according to a second example;

FIGS. 7A and 7B are conceptual diagrams that illustrate routes, wherein FIG. 7A is a conceptual diagram that illustrates routes specified by the route specification unit, and FIG. 7B is a conceptual diagram that illustrates a result of reconfiguring the routes of FIG. 7A with zero set as the number of route-constituting component routes with an origin-side user registered as a target viewed user by an end-side user;

FIG. 8 is a table that shows the number of component routes of the routes illustrated in FIG. 7A and the number of component routes of the reconfigured routes illustrated in FIG. 7B;

FIG. 9 is a table that illustrates information stored in the user database according to a third example;

DETAILED DESCRIPTION OF EXEMPLARY IMPLEMENTATIONS

Hereinafter, examples of a relevance analysis device, a relevance analysis method, and a relevance analysis program will be described in detail with reference to the drawings.

I. FIRST EXAMPLE

A first example will be explained here. This example specifies a mutual relevance between an analysis reference user and an analysis target user, based on a number of component routes that constitute a route having an origin that corresponds to the analysis reference user and an end that corresponds to the analysis target user, and based on whether on each component route a user more toward the origin (an origin-side user) is registered as a target viewed user by a user more toward the end (an end-side user).

A. Constitution

Figure 1:
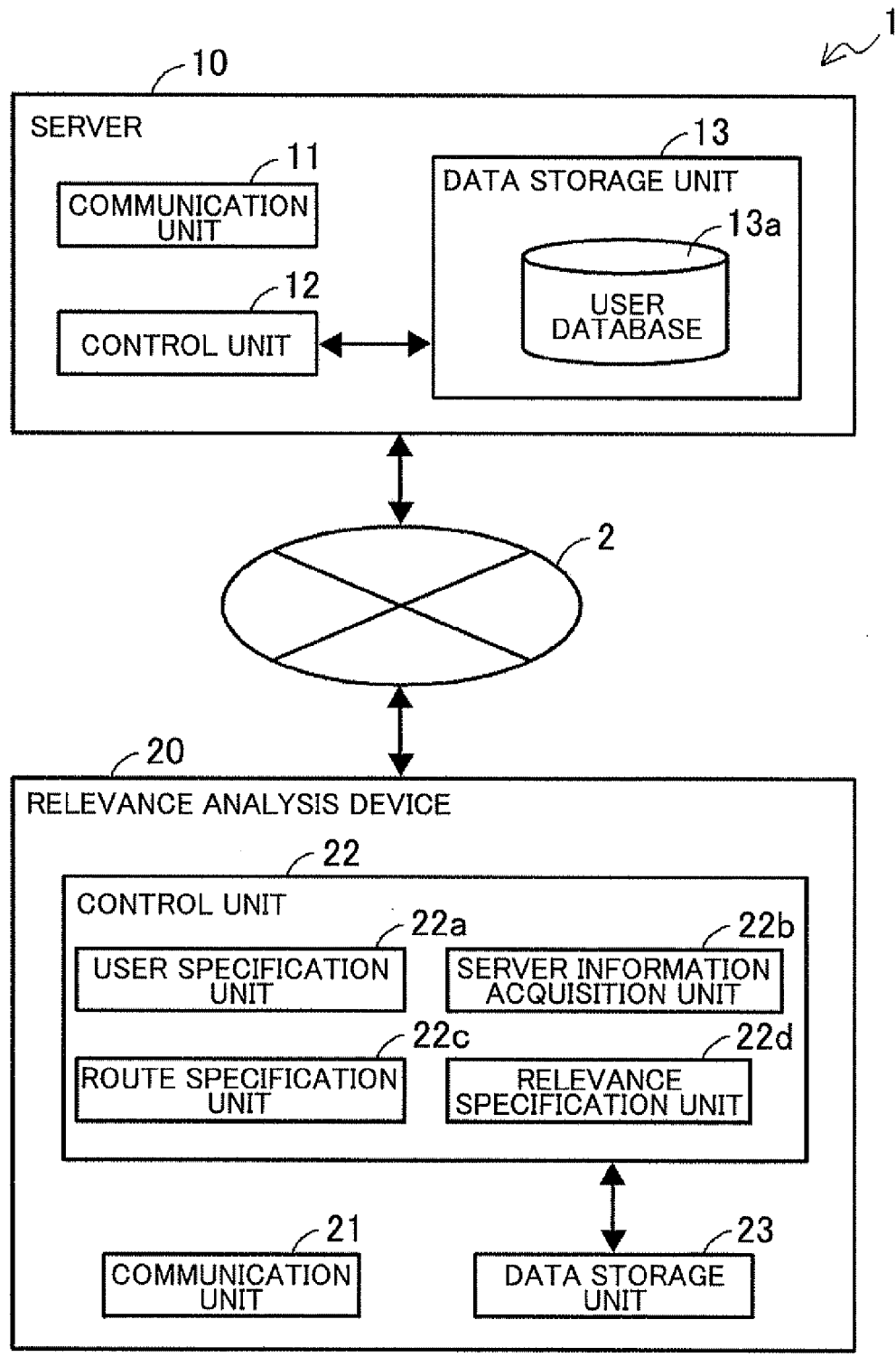
FIG. 1 is a block diagram that illustrates a relevance analysis system according to a first example.

First, the constitution of the relevance analysis system according to the first example will be described. FIG. 1 is a block diagram that illustrates the relevance analysis system according to the first example. As shown in FIG. 1, the relevance analysis system 1 includes a server 10 and a relevance analysis device 20. The server 10 and the relevance analysis device 20 are communicably connected to each other through a network 2.

1. Server

The server 10 allows information provided by a user (referred to as "provided information" below as necessary) to be viewed by another user. If a user registers another user as a target viewed user, the server 10 allows the user to view information provided by the target viewed user thus registered. The specific content of the server 10 may take on any form, for example, the Twitter server, an SNS server or a server that hosts various blog sites may be used. The server 10 includes a communication unit 11, a controller (e.g., control unit 12), and a data storage unit 13.

a. Communication Unit

The communication unit 11 communicates through the network 2 with the relevance analysis device 20. A known communication device may be used as the communication unit 11.

b. Control Unit

The control unit 12 controls the server 10. Specifically, the control unit 12 is a computer configured to include a CPU, various programs that are interpreted and executed in the CPU (including an OS and other basic control programs, and application programs that are activated in the OS to carry out specific functions), and an internal memory such as a RAM for storing the programs and various data (likewise with respect to a control unit 22 of the relevance analysis device 20 that will be described later).

c. Data Storage Unit

The data storage unit 13 is a storage unit that stores programs and various data required for operation of the server 10, and has a configuration that uses a magnetic storage medium such as a hard disk (not shown) as an external memory device, for example. However, any other storage medium, including a semiconductor type storage medium such as a flash memory or an optical storage medium such as a DVD or Blu-ray disc, may be used in place of or in combination with the hard disk (likewise with respect to a data storage unit 23 of the relevance analysis device 20 that will be described later).

The data storage unit 13 includes a user database 13a. (Note that "database" will be abbreviated to "DB" below.) FIG. 2 is a table that illustrates information stored in the user DB 13a. As shown in FIG. 2, information that corresponds to the table items of User ID and Target Viewed User ID are mutually associated and stored in the user DB 13a. Information stored as corresponding to the User ID item is identification information that uniquely identifies a user (e.g., "A" in FIG. 2). Information stored as corresponding to the Target Viewed User item is registration information for specifying a target viewed user registered by the user (e.g., "B, E, P, . . . " in FIG. 2).

Note that a terminal (not shown) is connected through the network 2 to the server 10, and the user can provide information through the terminal to the server 10. If the provided information and the identification information corresponding to the user who provided the provided information are provided through the network 2 to the server 10 from the terminal, the control unit 12 of the server 10 refers to the user DB 13a and stores the provided information in the data storage unit 13 such that the provided information can be viewed by another user who has registered the user who provided the provided information as a target viewed user.

2. Relevance Analysis Device

Returning to FIG. 1, the relevance analysis device 20 is used for analyzing a mutual relevance between a plurality of users utilizing the server 10. The relevance analysis device 20 includes a communication unit 21, a controller (e.g., the control unit 22), and the data storage unit 23.

a. Communication Unit

The communication unit 21 communicates through the network 2 with the server 10. A known communication device may be used as the communication unit 21.

b. Control Unit

The control unit 22 includes a user specification unit 22a, a server information acquisition unit 22b, a route specification unit 22c, and a relevance specification unit 22d in terms of functional concept. The user specification unit 22a specifies, from among the plurality of users, an analysis reference user who serves as a reference for analysis, and an analysis target user who serves as a target for analysis of relevance to the analysis reference user. The server information acquisition unit 22b acquires, from the server 10, the identification information that uniquely identifies the user, and the registration information for specifying the target viewed user registered by the user. The route specification unit 22c specifies routes based on the identification information and the registration information acquired by the server information acquisition unit 22b. Each route is constituted from one or a plurality of continuous component routes that span between the user and a target viewed user registered by the user. In addition, the route has an origin that is the analysis reference user specified by the user specification unit 22a, and an end that is the analysis target user specified by the user specification unit 22a. Further, each component route of the route has a relationship in which the end-side user is registered as a target viewed user by the origin-side user. The relevance specification unit 22d specifies a mutual relevance between the analysis reference user and the analysis target user. The processes executed by the various portions of the control unit 22 will be described in detail later. Note that the relevance analysis program according to the first example is installed in the relevance analysis device 20 through any storage medium or network, and configures various portions of the control unit 22 in substance.

c. Data Storage Unit

The data storage unit 23 is a storage unit that stores programs and various data required for operation of the relevance analysis device 20.

B. Processing

Next, a relevance analysis method will be described with respect to the relevance analysis process algorithm shown in FIG. 3. The process algorithm may be implemented in the form of a computer program that is stored in, for example, on or more RAMs and/or ROMs included in the relevance analysis system 1, and executed by either or both of control units 12 and 22. Although the structure of the above-described relevance analysis system 1 is referenced in the description of the process, the reference to such structure is exemplary, and the process need not be limited by the specific structure of the relevance analysis system 1.

The relevance analysis process is started up, for example, after the relevance analysis device 20 is powered on and there is an input through an input mechanism (not shown) instructing execution of the relevance analysis process.

Figure 3:
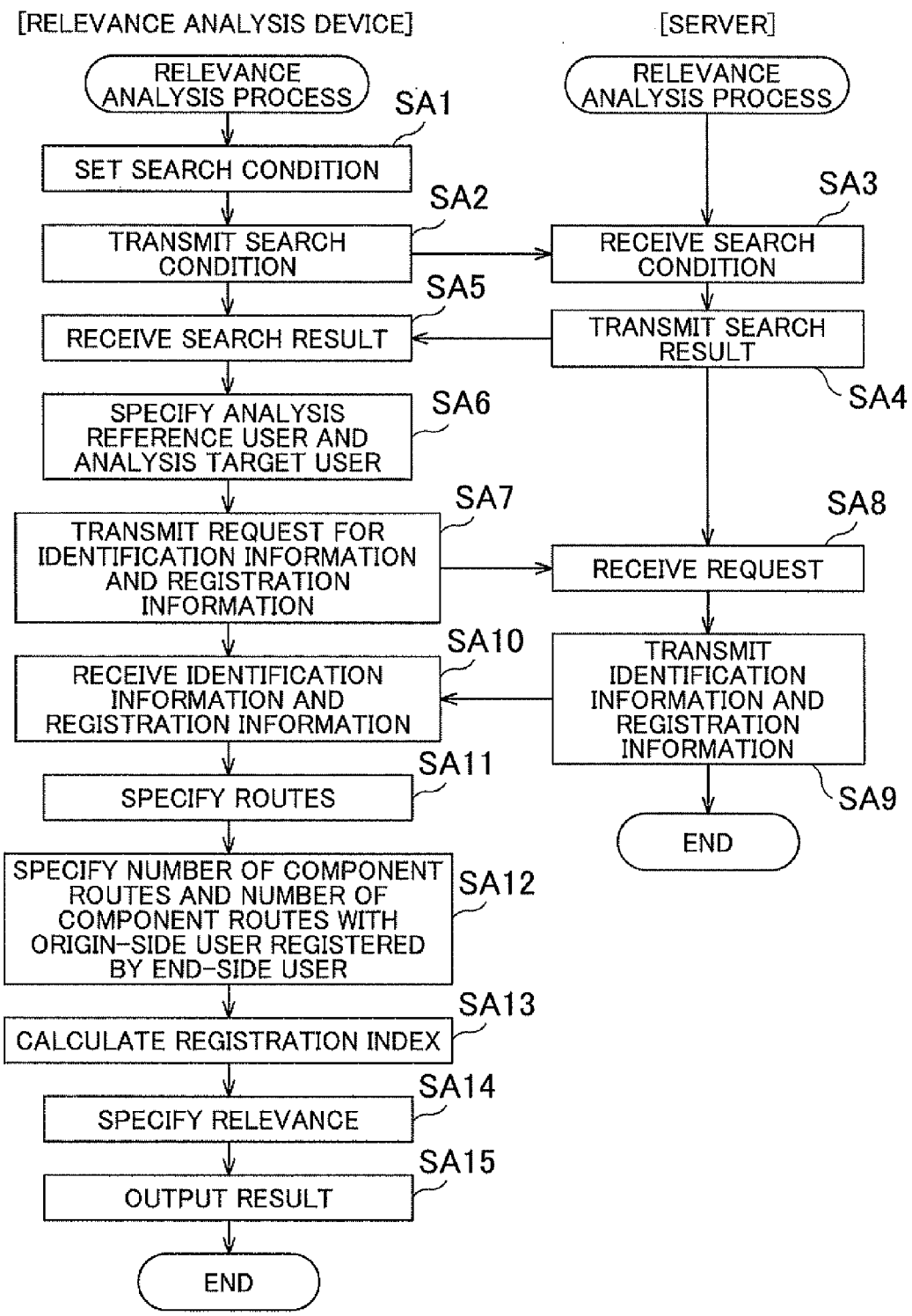
FIG. 3 is a flowchart of a relevance analysis process algorithm.

As shown in FIG. 3, once the relevance analysis process is initiated, the user specification unit 22a sets a search condition for finding in the server 10 prescribed provided information that is provided to the server 10 by a user (SA1). For example, the user specification unit 22a outputs information that prompts the input of a search condition from an output mechanism (not shown), and sets a condition input through the input mechanism (not shown) as the search condition. Here, as the set search condition, a keyword (e.g., a facility name or a point name) for finding the provided information that includes information the user wants to know may be used.

Next, the user specification unit 22a transmits the search condition set at SA1 through the network 2 to the server 10 from the communication unit 21 (SA2). After the control unit 12 of the server 10 receives the search condition transmitted from the relevance analysis device 20 through the communication unit 11 (SA3), the control unit 12 finds the provided information that matches the search condition in the data storage unit 13, and transmits the found provided information together with the identification information of the user who provided the provided information through the network 2 to the relevance analysis device 20 from the communication unit 11 (SA4).

For example, at SA2, a restaurant name "XY" may be transmitted as the search condition to the server 10 from the relevance analysis device 20. Here, the following are found as the provided information that includes "XY": the provided information of "Recommend fried pork curry at XY" that is provided by a user identified by the identification information "D" and the provided information of "Recommend ramen at XY" that is provided by a user identified by the identification information "G" is found. In such case, at SA4, the control unit 12 of the server 10 transmits a list that associates such provided information and the identification information of the users that provided the provided information to the relevance analysis device 20.

The user specification unit 22a receives, through the communication unit 21, the provided information and the identification information that corresponds to such provided information transmitted from the server 10 (SA5). The user specification unit 22a then specifies the analysis reference user who serves as the reference for analysis, and also specifies, out of the users specified based on the identification information received at SA5, the analysis target user who serves as the target for analysis of relevance to the analysis reference user (SA6). For example, the user specification unit 22a outputs information that prompts the input of identification information that corresponds to the analysis reference user from the output mechanism (not shown). The user specification unit 22a then specifies the user who corresponds to the identification information input through the input mechanism (not shown) as the analysis reference user. Alternatively, the user specification unit 22a outputs information that prompts the selection of the analysis target user out of the users that correspond to the identification information received at SA5 and the input of the identification information of the user from the output mechanism (not shown). The user specification unit 22a then specifies the user who corresponds to the identification information input through the input mechanism (not shown) as the analysis target user.

Next, the server information acquisition unit 22b requests that the server 10 transmit the identification information and the registration information stored in the user DB 13a of the server 10 (SA7). After the control unit 12 of the server 10 receives through the communication unit 11 the request for transmission of the identification information and the registration information (SA8), the control unit 12 transmits the identification information and the registration information stored in the user DB 13a through the network 2 to the relevance analysis device 20 from the communication unit 11 (SA9). Note that the control unit 12 of the server 10 may transmit all the identification information and registration information stored in the user DB 13a through the communication unit 11 to the relevance analysis device 20. Alternatively, the control unit 12 may transmit only the identification information and registration information that match a prescribed condition (e.g., if area setting information that specifies an area set for every user is stored associated with the identification information, the identification information and the registration information of the users who have the same area setting as the analysis reference user or the analysis target user) among the identification information and the registration information stored in the user DB 13a through the communication unit 11 to the relevance analysis device 20. Following the processing at SA9, the control unit 12 of the server 10 ends the relevance analysis process.

The server information acquisition unit 22b receives, through the communication unit 21, the identification information and the registration information transmitted from the server 10 (SA10). The route specification unit 22c specifies routes based on the identification information and the registration information acquired by the server information acquisition unit 22b (SA11). Each route is constituted from one or a plurality of continuous component routes that span between the user and a target viewed user registered by the user. In addition, the route has an origin that is the analysis reference user and an end that is the analysis target user. Further, each component route of the route has a relationship in which the end-side user is registered as a target viewed user by the origin-side user. The route specification unit 22c specifies the shortest route having an origin that is the analysis reference user and an end that is the analysis target user using a known route search method such as Dijkstra's algorithm, for example.

Figures 4, 5:
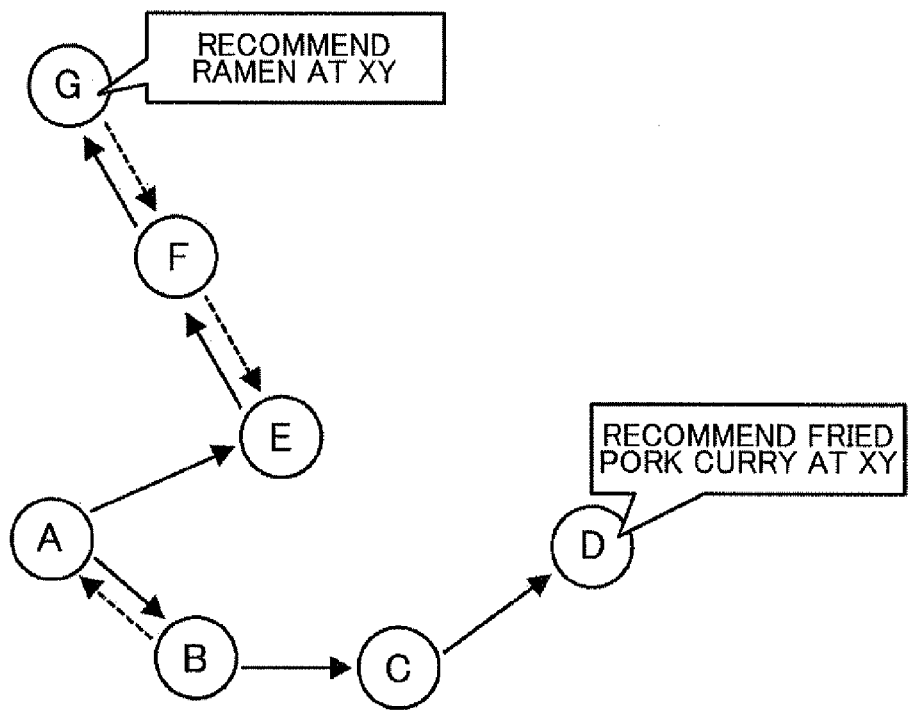
FIG. 4 is a conceptual diagram that illustrates routes specified by a route specification unit.
FIG. 5 is a table that shows the relationship between a number of component routes, a registration index, and a relevance of each route illustrated in FIG. 4.

FIG. 4 is a conceptual diagram that illustrates routes specified by the route specification unit 22c. In FIG. 4, the alphabet letters in circles represent the identification information. In the example of FIG. 4, A is the analysis reference user (i.e., route origin), and D and G are the analysis target users (i.e., route ends) that provided the provided information that includes the keyword "XY." The arrows between each alphabet letter represent component routes from each user to a target viewed user registered by that particular user. The solid arrows indicate component routes that constitute a route having an origin that is the analysis reference user and an end that is the analysis target user (i.e., component routes with the end-side user registered as a target viewed user by the origin-side user). The dashed arrows indicate the component routes, among the route-constituting component routes, with the origin-side user registered as a target viewed user by the end-side user. According to FIG. 4, the route specification unit 22c has specified two routes: a route that starts at an origin A and ends at an end D, with component routes connecting at B, C, and D in that order; and a route that starts at the origin A and ends at an end G, with component routes connecting at E, F, and G in that order.

Returning to FIG. 3, the relevance specification unit 22d specifies the number of component routes that constitute the routes specified by the route specification unit 22c, and also specifies, based on the identification information and the registration information, the number of component routes, out of the route-constituting component routes, with the origin-side user registered as a target viewed user by the end-side user (SA12). In the example of FIG. 4, the relevance specification unit 22d specifies "3" as the number of component routes that constitute the route from the origin A to the end D (solid arrows in FIG. 4), and specifies "1" as the number of component routes, out of the route-constituting component routes, with the origin-side user registered as a target viewed user by the end-side user (dashed arrows in FIG. 4). In addition, the relevance specification unit 22d specifies "3" as the number of component routes that constitute the route from the origin A to the end G, and specifies "2" as the number of component routes, out of the route-constituting component routes, with the origin-side user registered as a target viewed user by the end-side user.

Returning to FIG. 3, the relevance specification unit 22d calculates a registration index of each route, based on the number of component routes, out of the route-constituting component routes, with the origin-side user registered as a target viewed user by the end-side user, as specified by the relevance specification unit 22d at SA12 (SA13). The "registration index" is an index used by the relevance specification unit 22d to specify the mutual relevance between the analysis reference user and the analysis target user, and is calculated according to the following equation (1):

$$\text{registration index} = \begin{pmatrix} \text{number of component routes,} \\ \text{out of route-constituitng component} \\ \text{routes, with origin-side user registered} \\ \text{as target viewed user by end-side user} \end{pmatrix} + \\ \begin{bmatrix} \begin{pmatrix} \text{number of} \\ \text{route-constiuitng component} \\ \text{routes} \end{pmatrix} - \\ \begin{pmatrix} \text{number of component routes,} \\ \text{out of route-constituitng component} \\ \text{routes, with origin-side user registered} \\ \text{as target viewed user by end-side user} \end{pmatrix} \end{bmatrix} \times 2 \quad (1)$$

According to this equation, the registration index becomes smaller as the number of route-constituting component routes decreases and the number of component routes, out of the route-constituting component routes, with the origin-side user registered as a target viewed user by the end-side user increases. In the example of FIG. 4, for the route from the origin A to the end D, 3 is the number of route-constituting component routes and 1 is the number of component routes, out of the route-constituting component routes, with the origin-side user registered as a target viewed user by the end-side user. Therefore, the registration index is calculated as 1+(3−1)×2=5. In addition, for the route from the origin A to the end G, 3 is the number of route-constituting component routes and 2 is the number of component routes, out of the route-constituting component routes, with the origin-side user registered as a target viewed user by the end-side user. Therefore, the registration index is calculated as 2+(3−2)×2=4.

Returning to FIG. 3, the relevance specification unit 22d specifies the mutual relevance between the analysis reference user and the analysis target user based on the number of component routes that constitute each route as specified by the relevance specification unit 22d at SA12 and the registration index of each route as specified by the relevance specification unit 22d at SA13 (SA14). More specifically, the relevance specification unit 22d calculates, as a numerical value indicative of relevance, the sum of the number of component routes constituting each route and the registration index of each particular route. As explained above, the registration index becomes smaller as the number of route-constituting component routes decreases and the number of component routes, out of the route-constituting component routes, with the origin-side user registered as a target viewed user by the end-side user increases. Therefore, the numerical value indicative of relevance also becomes smaller as the number of route-constituting component routes decreases and the number of component routes, out of the route-constituting component routes, with the origin-side user registered as a target viewed user by the end-side user increases. Here, a small number of route-constituting component routes can be taken to mean that the distance on the network between the analysis reference user and the analysis target user is small, and also that the relevance between the analysis reference user and the analysis target user is high. Further, a large number of component routes, out of the route-constituting component routes, with the origin-side user registered as a target viewed user by the end-side user can be taken to mean that there are many combinations of users who have mutually registered each other as target viewed users among the route-constituting component routes, and also that the route is constituted by users with high mutual relevance. Therefore, the relevance between the analysis reference user and the analysis target user can be considered high. Thus, a smaller numerical value indicative of relevance shows a higher relevance between the analysis reference user and the analysis target user.

In the example of FIG. 4, for the route from the origin A to the end D, 3 is the number of route-constituting component routes and 5 is the registration index. Therefore, the relevance is calculated as 3+5=8. In addition, for the route from the origin A to the end G, 3 is the number of route-constituting component routes and 4 is the registration index. Therefore, the relevance is calculated as 3+4=7. FIG. 5 is a table that shows the relationship between the number of component routes, the registration index, and the relevance of each route illustrated in FIG. 4. As shown in FIG. 5, the route from the origin A to the end D and the route from the origin A to the end G have an equal number of component routes, that is, 3 component routes. However, compared to the registration index of 5 for the route from the origin A to the end D, the route from the origin A to the end G has a smaller registration index of 4. Thus, the numerical value indicative of the relevance between the analysis reference user and the analysis target user is smaller for the route from the origin A to the end G with a relevance of 7 compared to the route from the origin A to the end D with a relevance of 8. Based on this, the mutual relevance between the analysis reference user A and the analysis target user G is specified as higher than the mutual relevance between the analysis reference user A and the analysis target user D.

Returning to FIG. 3, the relevance specification unit 22d outputs the specification result of the mutual relevance between the analysis reference user and the analysis target user (SA15). Note that the output of the relevance specification result may take on any form. For example, the numerical value indicative of relevance calculated at SA14 may be output for every route through the output mechanism (not shown) that may be a display. Alternatively, the provided information and the identification information transmitted from the server 10 to the relevance analysis device 20 at SA4 which correspond to the analysis target user may be arranged in order starting with the highest mutual relevance between the analysis reference user and the analysis target user (i.e., in order starting with the smallest numerical value indicative of relevance), and output through the output mechanism. Following the processing at SA15, the control unit 22 of the relevance analysis device 20 ends the relevance analysis process.

C. Effects

According to the first example described above, the relevance specification unit 22d specifies the mutual relevance between the analysis reference user and the analysis target user based on the number of component routes that constitute a route having an origin that is the analysis reference user and an end that is the analysis target user, and based on whether the origin-side user is registered as a target viewed user by the end-side user of each component route. Therefore, the mutual relevance between the analysis reference user and the analysis target user can be suitably analyzed in consideration of the distance between the analysis reference user and the analysis target user in the network and the relevance of the users of the route-constituting component routes to each other. It is thus possible to provide material for determining whether the user who provided the provided information to the server 10 is a user highly relevant to the user viewing the information.

In particular, the relevance specification unit 22d specifies a higher mutual relevance between the analysis reference user and the analysis target user as the number of route-constituting component routes decreases and the number of component routes, out of the route-constituting component routes, with the origin-side user registered as a target viewed user by the end-side user increases. Therefore, if the users on the route-constituting component routes have registered each other, the high mutual relevance of such users can be incorporated into determining the mutual relevance between the analysis reference user and the analysis target user. Accordingly, relevance can be even more suitably analyzed.

II. SECOND EXAMPLE

Next, a second example will be described. In this example, the number of component routes, out of the route-constituting component routes, with the origin-side user registered as a target viewed user by the end-side user is set to zero. The configuration of the second example is generally identical to the configuration of the first example unless otherwise noted. For configurations generally identical to those of the first example, the same reference symbols and/or names as used in the first example are assigned as necessary and accompanying explanations are omitted.

A. Processing

The relevance analysis process executed by the relevance analysis system 1 according to the second example will be described. FIG. 6 is a flowchart of the relevance analysis process according to the second example. Note that, among the relevance analysis process according to the second example, SB1 to SB11 and SB15 are identical to SA1 to SA11 and SA15 in FIG. 3, respectively, and will not be further explained here.

Following the processing at SB11, based on the identification information and the registration information received at SB10, the relevance specification unit 22d specifies the component routes, out of the component routes that constitute the routes specified by the route specification unit 22c, with the origin-side user registered as a target viewed user by the end-side user (SB12).

Figure 7A:
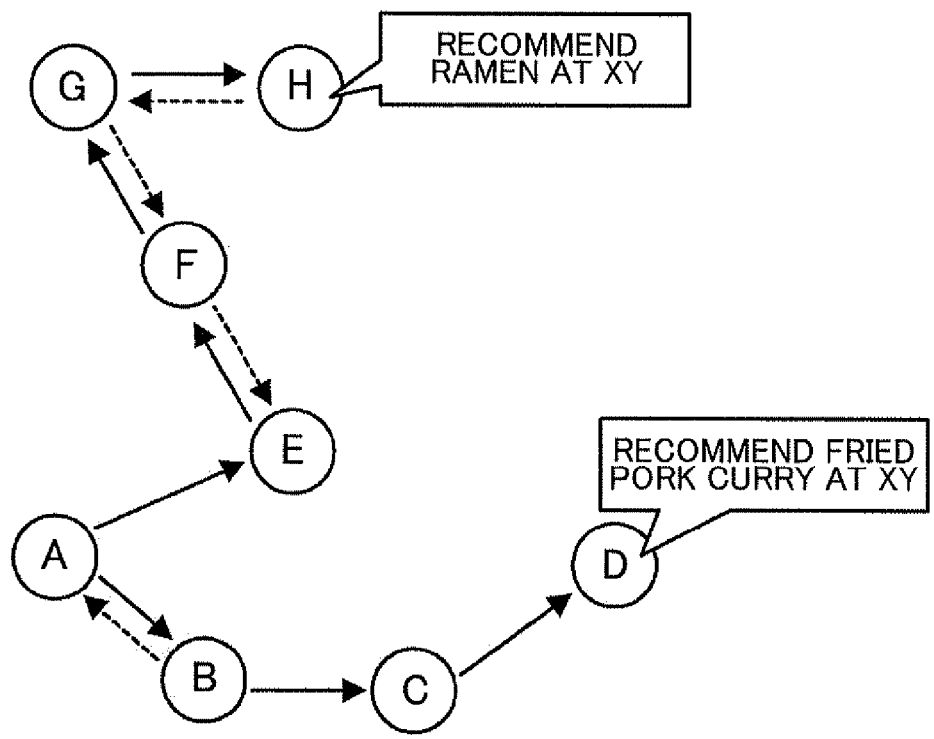

FIG. 7A is a conceptual diagram that illustrates routes specified by the route specification unit 22c. In the example of FIG. 7A, A is the analysis reference user (i.e., route origin), and D and H are the analysis target users (i.e., route ends) that provided the provided information that includes the keyword "XY." According to FIG. 7A, the route specification unit 22 has specified two routes: a route that starts at an origin A and ends at an end D, with component routes connecting at B, C, and D in that order; and a route that starts at the origin A and ends at an end H, with component routes connecting at E, F, G, and H in that order.

Returning to FIG. 6, the relevance specification unit 22d specifies the number of the component routes that constitute the routes specified by the route specification unit 22c, with zero set as the number of component routes with the origin-side user registered as a target viewed user by the end-side user (SB13).

Figure 7B:
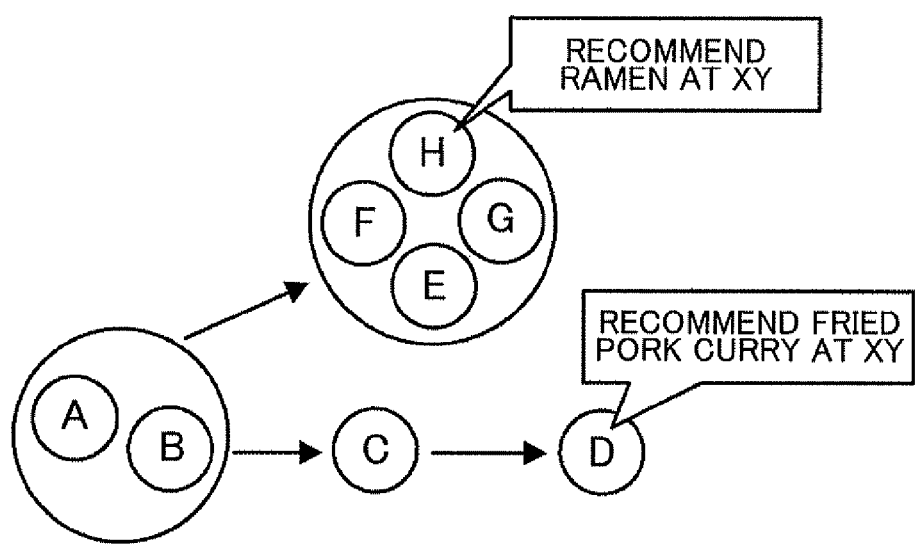

FIG. 7B is a conceptual diagram that illustrates a result of reconfiguring the routes of FIG. 7A with zero set as the number of route-constituting component routes with the origin-side user registered as a target viewed user by the end-side user. According to FIG. 7A, among the various component routes that constitute the route from the origin A to the end D, the origin-side user is registered as a target viewed user by the end-side user on the component route between A and B. In such case, the relevance specification unit 22d sets zero as the number of component routes between A and B. That is, as shown in FIG. 7B, A and B constitute a group in which the distance between A and B on the network is zero. Thus, the relevance specification unit 22d specifies "2" as the number of component routes that constitute the route from the origin A to the end D. In addition, according to FIG. 7A, among the various component routes that constitute the route from the origin A to the end H, the origin-side user is registered as a target viewed user by the end-side user on the component routes between E and F, F and G, and G and H. In such case, the relevance specification unit 22d sets zero as the number of component routes between E and F, F and G, and G and H. That is, as shown in FIGS. 7B, E, F, G, and H constitute a group in which the distance between each on the network is zero. Thus, the relevance specification unit 22d specifies "1" as the number of component routes that constitute the route from the origin A to the end H.

Returning to FIG. 6, the relevance specification unit 22d specifies the number of component routes specified by the relevance specification unit 22d at SB13 as a numerical value indicative of the mutual relevance between the analysis reference user and the analysis target user (SB14). FIG. 8 is a table that shows the number of component routes (original number of component routes) of the route illustrated in FIG. 7A and the number of component routes of the reconfigured routes illustrated in FIG. 7B. As shown in FIG. 8, 3 is the number of original component routes of the route from the origin A to the end D, while 4 is the number of original component routes of the route from the origin A to the end H. Therefore, the route from the origin A to the end H has a larger number of component routes. However, if the route is reconfigured with zero set as the number of route-constituting component routes with the origin-side user registered as a target viewed user by the end-side user, 2 is the number of component routes of the route from the origin A to the end D, while 1 is the number of component routes of the route from the origin A to the end H. Therefore, the route from the origin A to the end H has a smaller number of component routes. Based on this, the relevance between the analysis reference user A and the analysis target user H is specified as higher than the relevance between the analysis reference user A and the analysis target user D.

B. Effects

According to the second example as described above, when specifying the number of route-constituting component routes, the relevance specification unit 22d specifies zero as the number of route-constituting component routes with the origin-side user registered as a target viewed user by the end-side user. Therefore, if the users on the route-constituting component routes have registered each other, the high mutual relevance of such users can be incorporated into determining the mutual relevance between the analysis reference user and the analysis target user. Accordingly, relevance can be even more suitably analyzed.

III. THIRD EXAMPLE

Next, a third example will be described. In this example, the mutual relevance between the analysis reference user and the analysis target user is specified based on a quantity of information the origin-side user provides addressed to the end-side user on each route-constituting component route. The configuration of the third example is generally identical to the configuration of the first example unless otherwise noted. For configurations generally identical to those of the first example, the same reference symbols and/or names as used in the first example are assigned as necessary and accompanying explanations are omitted.

A. Constitution

First, the constitution of the relevance analysis system 1 according to the third example will be described.

1. Server a. Data Storage Unit

FIG. 9 is a table that illustrates information stored in the user DB 13a according to the third example. As shown in FIG. 9, information that corresponds to the table item of Provision Quantity Information is stored associated with the information that corresponds to the table items of User ID and Target Viewed User ID. The information stored corresponding to the Provision Quantity Information item is provision quantity information that specifies a quantity of information provided by each user to the server 10 as addressed to another user. The identification information of the addressed user (e.g., "B" in FIG. 9) is stored corresponding to the sub-item of Addressee, and the quantity of information provided to the server 10 addressed to that particular user (e.g., "20" in FIG. 9) is stored corresponding to the sub-item Provision Quantity.

B. Processing

Figure 10:
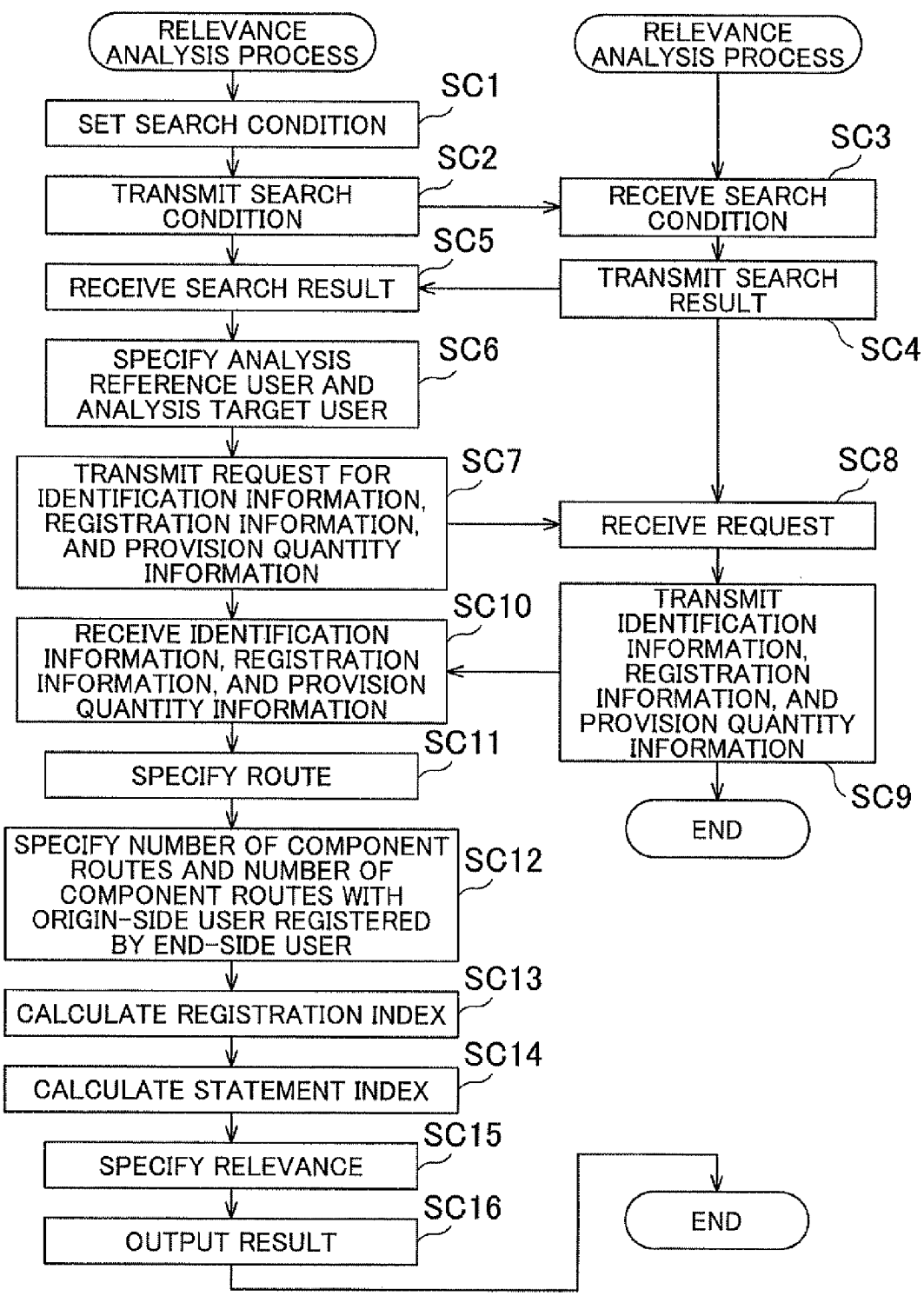
FIG. 10 is a flowchart of the relevance analysis process algorithm according to the third example.

Next, the relevance analysis process executed by the relevance analysis system 1 according to the third example will be described. FIG. 10 is a flowchart of the relevance analysis process according to the third example. Note that, among the relevance analysis process according to the third example, SC1 to SC6, SC11 to SC13, and SC16 are identical to SA1 to SA6, SA11 to SA13, and SA15 in FIG. 3, respectively, and will not be further explained here.

Following the processing at SC6, the server information acquisition unit 22b requests that the server 10 transmit the identification information, the registration information, and provision quantity information stored in the user DB 13a of the server 10 (SC7). After the control unit 12 of the server 10 receives through the communication unit 11 the request for transmission of the identification information, the registration information, and the provision quantity information (SC8), the control unit 12 transmits the identification information, the registration information, and the provision quantity information stored in the user DB 13a through the network 2 to the relevance analysis device 20 from the communication unit 11 (SC9). Following the processing at SC9, the control unit 12 of the server 10 ends the relevance analysis process.

The server information acquisition unit 22b receives, through the communication unit 21, the identification information, the registration information, and the provision quantity information transmitted from the server 10 (SC10).

Following the processing at SC13, the relevance specification unit 22d calculates a statement index for each route, based on the provision quantity information received by the server information acquisition unit 22b from the server 10 at SC10 (SC14). The "statement index" is an index used by the relevance specification unit 22d to specify the mutual relevance between the analysis reference user and the analysis target user. For example, the relevance specification unit 22d calculates the following equation (2) for each component route, among the component routes that constitute a route, with the origin-side user and the end-side user providing information to the server 10 addressed to each other:

$$\text{value} = \frac{\left(\begin{array}{c}\text{quantity of information provided by origin-side}\\\text{user to server 10 addressed to end-side user}\end{array}\right)}{\left(\begin{array}{c}\text{quantity of all information provided by origin-side}\\\text{user to server 10 addressed to other users}\end{array}\right)} \quad (2)$$

The total sum of the calculated values is the statement index. That is, the statement index becomes larger as the proportion of information addressed to the end-side user increases with respect to the information provided by the origin-side user to the server 10 addressed to other users.

Figures 11, 12:
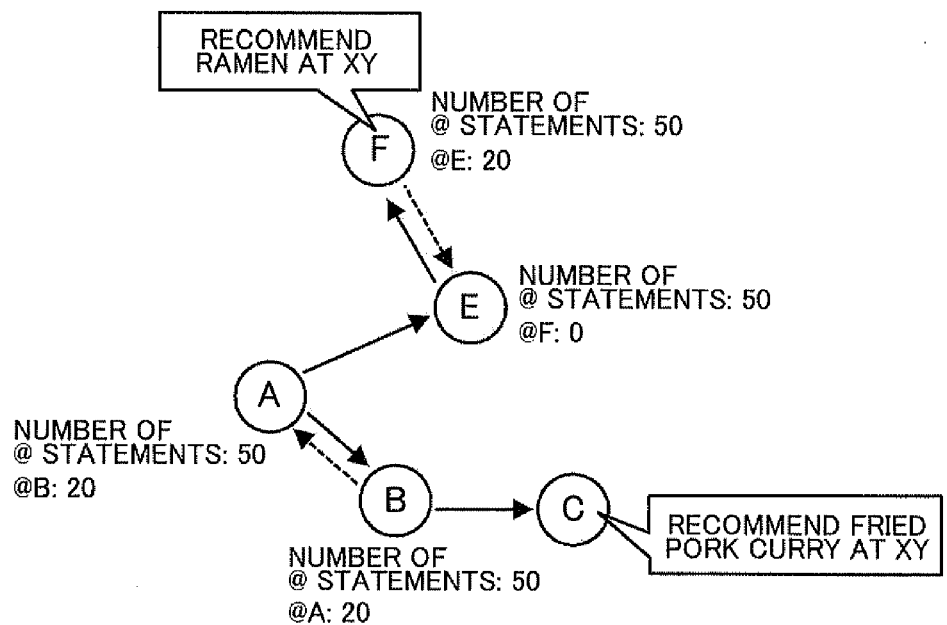
FIG. 11 is a conceptual diagram that illustrates routes specified by the route specification unit.
FIG. 12 is a table that shows the relationship between the number of component routes, the registration index, and a statement index of each route illustrated in FIG. 11.

FIG. 11 is a conceptual diagram that illustrates routes specified by the route specification unit 22c. In the example of FIG. 11, A is the analysis reference user (i.e., route origin), and C and F are the analysis target users (i.e., route ends) that provided the provided information that includes the keyword "XY." According to FIG. 11, the route specification unit 22c has specified two routes: a route that starts at the origin A and ends at an end C, with component routes connecting at B and C in that order; and a route that starts at the origin A and ends at an end F, with component routes connecting at E and F in that order. Also, in FIG. 11, "number of @ statements" indicates the quantity of all information provided by the user to the server 10 addressed to other users, and "@alphabet letter" indicates the quantity of information provided by the user to the server 10 addressed to another user corresponding to that alphabet letter. According to the example of FIG. 11, for the route from the origin A to the end C, the component route between A and B is a component route for which the origin-side user and the end-side user provided information to the server 10 addressed to each other. On this component route, 20 is the quantity of information provided by the origin-side user A to the server 10 addressed to the end-side user B, and 50 is the quantity of all information provided by the origin-side user A to the server 10 addressed to other users. Therefore, the statement index is calculated as 20/50=0.4. Meanwhile, for the route from the origin A to the end F, there is no component route for which the origin-side user and the end-side user provided information to the server 10 addressed to each other. Therefore, the statement index is calculated as zero.

Returning to FIG. 10, the relevance specification unit 22d specifies the mutual relevance between the analysis reference user and the analysis target user based on the number of component routes that constitute each route as specified by the relevance specification unit 22d at SC12, the registration index of each route as calculated at SC13, and the statement index of each route as calculated at SC14 (SC15). More specifically, the relevance specification unit 22d calculates, as a numerical value indicative of relevance, a value that subtracts the statement index of a particular route from the sum of the number of component routes constituting the route and the registration index of the route. As described above, the statement index becomes larger as the proportion of information provided by the origin-side user to the server 10 addressed to the end-side user increases with respect to the information provided by the origin-side user to the server 10 addressed to other users. Therefore, the value indicative of relevance becomes smaller as the proportion of information provided by the origin-side user to the server 10 addressed to the end-side user increases.

In the example of FIG. 11, for the route from the origin A to the end C, 2 is the number of route-constituting component routes, 3 is the registration index, and 0.4 is the statement index. Therefore, the relevance is calculated as 2+3−0.4=4.6. In addition, for the route from the origin A to the end F, 2 is the number of route-constituting component routes, 3 is the registration index, and 0 is the statement index. Therefore, the relevance is calculated as 2+3−0=5. FIG. 12 is a table that shows the relationship between the number of component routes, the registration index, the statement index, and the relevance of each route illustrated in FIG. 11. As shown in FIG. 12, for both the route from the origin A to the end C and the route from the origin A to the end F, the sum of the number of component routes and the registration index is the same, that is, 5. However, compared to the statement index of 0.4 for the route from the origin A to the end C, the route from the origin A to the end F has a statement index of zero. Consequently, the numerical value indicative of the relevance between the analysis reference user and the analysis target user is larger for the route from the origin A to the end F with a relevance of 5 compared to the route from the origin A to the end C with a relevance of 4.6. Based on this, the relevance between the analysis reference user A and the analysis target user C is specified as higher than the relevance between the analysis reference user A and the analysis target user F. This reflects the fact that, on the component route between A and B that constitutes the route from the origin A to the end C, the origin-side user A provided information addressed to the end-side user B and therefore the mutual relevance between the users on that particular component route is high.

C. Effects

According to the third example described above, the relevance specification unit 22d specifies the quantity of information provided by the origin-side user addressed to the end-side user for each route-constituting component route, and specifies the mutual relevance between the analysis reference user and the analysis target user based on the specified quantity. Therefore, if information is provided by the origin-side user addressed to the end-side user on any route-constituting component route, the high mutual relevance of such users can be incorporated into &twinning the mutual relevance between the analysis reference user and the analysis target user. Accordingly, relevance can be even more suitably analyzed.

IV. MODIFICATIONS

While various features have been described in conjunction with the examples outlined above, various alternatives, modifications, variations, and/or improvements of those features and/or examples may be possible. Accordingly, the examples, as set forth above, are intended to be illustrative.

The problems to be solved and the effects are not limited to the content described above and may vary depending on the environment in which the inventive principles are practiced and the detailed configuration thereof. The above problems may be only partially solved, and the above effects only partially achieved.

Various changes, some examples of which are discussed below, may be made without departing from the broad spirit and scope of the underlying inventive principles.

A. Relevance Analysis Device

Although a location at which and an object in which to install the relevance analysis device 20 are not specifically mentioned in the examples described above, the relevance analysis device 20 may be mounted in a vehicle as part of a car navigation system, or mounted in a portable type of information terminal such as a smartphone, for example.

The electronic constituent elements described above are merely functional concepts, and need not be physically configured as illustrated in the drawings. That is, the specific form of division/integration of each portion is not limited to that shown in the drawings. The constituent elements, as a whole or in part, can be divided and/or integrated in any manner either functionally or physically based on various types of loads or use conditions. For example, some functions of the relevance analysis device 20 may be provided in the server 10 or a terminal, and various processing may be performed by the relevance analysis device 20 communicating with the server 10 or the terminal as necessary.

B. Relevance Analysis Process

In the examples described above, as an example, the route specification unit 22c specifies the shortest route having an origin that is the analysis reference user and an end that is the analysis target user. However, the route specification unit 22c may specify a route other than the shortest route.

In the examples described above, the mutual relevance between the analysis reference user and the analysis target user is specified based on the following: the number of component routes that constitute a route having an origin that is the analysis reference user and an end that is the analysis target user; whether the origin-side user is registered as a target viewed user by the end-side user on each component route; and the quantity of information provided by the origin-side user addressed to the end-side user on each route-constituting component route. However, other indices may also be utilized to specify the mutual relevance between the analysis reference user and the analysis target user. For example, the statement index may become larger (i.e., a higher relevance may be specified) as the frequency at which information is provided by the origin-side user addressed to the end-side user on each route-constituting component route increases. Alternatively, the registration index may become larger (i.e., a lower relevance may be specified) as the total number of other users registering a user as a target viewed user on each route-constituting component route increases, because the connection between the individual users is considered more tenuous.

According to the third example described above, the relevance specification unit 22d calculates the following for each component route, among the component routes that constitute a route, with the origin-side user and the end-user providing information to the server 10 addressed to each other: (quantity of information provided by origin-side user to server 10 addressed to end-side user)/(quantity of all information provided by origin-side user to server 10 addressed to other users). The total sum of the calculated values is the statement index. However, the statement index may be calculated using another method. For example, the relevance specification unit 22d may calculate the following for each component route, among the component routes that constitute a route, with the origin-side user and the end-user providing information to the server 10 addressed to each other: [(quantity of information provided by origin-side user to server 10 addressed to end-side user)+(quantity of information provided by end-side user to server 10 addressed to origin-side user)]/ [(quantity of all information provided by origin-side user to server 10 addressed to other users)+(quantity of all information provided by end-side user to server 10 addressed to other users)]. The total sum of the calculated values is the statement index. In such case, according to the example of FIG. 11, for the route from the origin A to the end C, the component route between A and B is a component route for which the origin-side user and the end-side user provided information to the server 10 addressed to each other. On the component route between A and B, 20 is the quantity of information provided by the origin-side user A to the server 10 addressed to the end-side user B, 20 is the quantity of information provided by the end-side user B to the server 10 addressed to the origin-side user A, 50 is the quantity of all information provided by the origin-side user A to the server 10 addressed to other users, and 50 is the quantity of all information provided by the end-side user B to the server 10 addressed to other users. Therefore, the statement index of the route from the origin A to the end C is calculated as (20+20)/(50+50)=0.4. Meanwhile, for the route from the origin A to the end F, there is no component route for which the origin-side user and the end-side user provided information to the server 10 addressed to each other. Therefore, the statement index is calculated as zero.

What is claimed is:

1. A relevance analysis device that analyzes a mutual relevance between a plurality of users utilizing a server that allows users to view information provided by target viewed users, the relevance analysis device comprising:
   a processor that:
      specifies out of the plurality of users an analysis reference user who serves as a reference for analysis, and an analysis target user who serves as a target for analysis of relevance to the analysis reference user;
      acquires from the server identification information that uniquely identifies the user, and registration information for specifying the target viewed user registered by the user;
      based on the identification information and the registration information, specifies a route that spans between the analysis reference user and the target viewed user, the specified route being constituted from at least one component route, the specified route having an origin that corresponds to the analysis reference user and an end that corresponds to the analysis target user, each component route of the specified route having a relationship in which an end-side user of the component route is registered as the target viewed user by an origin-side user of the component route;
      specifies a number of the component routes that constitute the specified route;
      for each of the component routes that constitute the specified route, specifies whether the origin-side user is registered as a target viewed user by the end-side user based on the identification information and the registration information; and
      specifies the mutual relevance between the analysis reference user and the analysis target user based on the specified number of the component routes and based on the number of the component routes in which the origin-side user is registered as a target viewed user by the end-side user.

2. The relevance analysis device according to claim 1, wherein the processor:
   specifies a higher mutual relevance between the analysis reference user and the analysis target user as the number of the component routes decreases; and
   specifies a higher mutual relevance between the analysis reference user and the analysis target user as the number of the component routes in which the origin-side user is registered as a target viewed user by the end-side user increases.

3. The relevance analysis device according to claim 2, wherein the processor:
   when specifying the number of the component routes, counts as zero each of the component routes with the origin-side user registered as a target viewed user by the end-side user.

4. The relevance analysis device according to claim 1, wherein the processor:
   acquires, from the server together with the identification information and the registration information, provision quantity information that specifies a quantity of information provided by each of the users on the specified route;
   for each of the component routes, specifies a quantity of information provided by the origin-side user addressed to the end-side user based on the provision quantity information; and specifies the mutual relevance between the analysis reference user and the analysis target user based on the specified quantities.

5. The relevance analysis device according to claim 1, wherein the processor selects the analysis target user based on a keyword search.

6. The relevance analysis device according to claim 1, wherein the processor:
   selects a plurality of the analysis target users based on a keyword search;
   specifies the mutual relevance between the analysis reference user and each of the plurality of the analysis target users; and
   communicates the specified relevance of each of the plurality of the analysis target users to a user of the relevance analysis device.

7. The relevance analysis device according to claim 1, wherein the specified relevance of each of the plurality of the analysis target users is displayed on a display in the form of a list, the list being presented in an order based on the specified relevance of each of the plurality of the analysis target users.

8. A relevance analysis method that analyzes a mutual relevance between a plurality of users utilizing a server that allows users to view information provided by target viewed users, the relevance analysis method comprising:
   specifying out of the plurality of users an analysis reference user who serves as a reference for analysis, and an analysis target user who serves as a target for analysis of relevance to the analysis reference user;
   acquiring from the server identification information that uniquely identifies the user, and registration information for specifying the target viewed user registered by the user;
   based on the identification information and the registration information, specifying a route that spans between the analysis reference user and the target viewed user, the specified route being constituted from at least one component route, the specified route having an origin that corresponds to the analysis reference user and an end that corresponds to the analysis target user, each component route of the specified route having a relationship in which an end-side user of the component route is registered as the target viewed user by an origin-side user of the component route;
   specifying a number of the component routes that constitute the specified route;
   for each of the component routes that constitute the specified route, specifying whether the origin-side user is registered as a target viewed user by the end-side user based on the identification information and the registration information; and
   specifying the mutual relevance between the analysis reference user and the analysis target user based on the specified number of the component routes and based on the number of the component routes in which the origin-side user is registered as a target viewed user by the end-side user.

9. The relevance analysis method according to claim 8, further comprising:
   specifying a higher mutual relevance between the analysis reference user and the analysis target user as the number of the component routes decreases; and
   specifying a higher mutual relevance between the analysis reference user and the analysis target user as the number of the component routes in which the origin-side user is registered as a target viewed user by the end-side user increases.

10. The relevance analysis method according to claim 9, further comprising:
    when specifying the number of the component routes, counting as zero each of the component routes with the origin-side user registered as a target viewed user by the end-side user.

11. The relevance analysis method according to claim 8, further comprising
    acquiring, from the server together with the identification information and the registration information, provision quantity information that specifies a quantity of information provided by each of the users on the specified route;
    for each of the component routes, specifying a quantity of information provided by the origin-side user addressed to the end-side user based on the provision quantity information; and
    specifying the mutual relevance between the analysis reference user and the analysis target user based on the specified quantities.

12. The relevance analysis method according to claim 8, further comprising:
    selecting the analysis target user based on a keyword search.

13. The relevance analysis method according to claim 8, further comprising:
    selecting a plurality of the analysis target users based on a keyword search;
    specifying the mutual relevance between the analysis reference user and each of the plurality of the analysis target users; and
    communicating the specified relevance of each of the plurality of the analysis target users to a user of the relevance analysis device.

14. The relevance analysis method according to claim 8, further comprising:
    displaying the specified relevance of each of the plurality of the analysis target users on a display in the form of a list, the list being presented in an order based on the specified relevance of each of the plurality of the analysis target users.

15. A non-transitory computer-readable storage medium storing a computer-executable relevance analysis program that analyzes a mutual relevance between a plurality of users utilizing a server that allows users to view information provided by target viewed users, the relevance analysis program comprising:
    instructions for specifying out of the plurality of users an analysis reference user who serves as a reference for analysis, and an analysis target user who serves as a target for analysis of relevance to the analysis reference user;
    instructions for acquiring from the server identification information that uniquely identifies the user, and registration information for specifying the target viewed user registered by the user;
    instructions for, based on the identification information and the registration information, specifying a route that spans between the analysis reference user and the target viewed user, the specified route being constituted from at least one component route, the specified route having an origin that corresponds to the analysis reference user and an end that corresponds to the analysis target user, each component route of the specified route having a relationship in which an end-side user of the component route is registered as the target viewed user by an origin-side user of the component route;

instructions for specifying a number of the component routes that constitute the specified route;

instructions for, for each of the component routes that constitute the specified route, specifying whether the origin-side user is registered as a target viewed user by the end-side user based on the identification information and the registration information; and instructions for specifying the mutual relevance between the analysis reference user and the analysis target user based on the specified number of the component routes and based on the number of the component routes in which the origin-side user is registered as a target viewed user by the end-side user.

16. The storage medium according to claim 15, the program further comprising:

instructions for specifying a higher mutual relevance between the analysis reference user and the analysis target user as the number of the component routes decreases; and instructions for specifying a higher mutual relevance between the analysis reference user and the analysis target user as the number of the component routes in which the origin-side user is registered as a target viewed user by the end-side user increases.

17. The storage medium according to claim 16, the program further comprising:

instructions for, when specifying the number of the component routes, counting as zero each of the component routes with the origin-side user registered as a target viewed user by the end-side user.

18. The storage medium according to claim 15, the program further comprising instructions for acquiring, from the server together with the identification information and the registration information, provision quantity information that specifies a quantity of information provided by each of the users on the specified route;

instructions for, for each of the component routes, specifying a quantity of information provided by the origin-side user addressed to the end-side user based on the provision quantity information; and instructions for specifying the mutual relevance between the analysis reference user and the analysis target user based on the specified quantities.

19. The storage medium according to claim 15, the program further comprising:

instructions for selecting the analysis target user based on a keyword search.

20. The storage medium according to claim 15, the program further comprising:

instructions for selecting a plurality of the analysis target users based on a keyword search;

instructions for specifying the mutual relevance between the analysis reference user and each of the plurality of the analysis target users; and instructions for communicating the specified relevance of each of the plurality of the analysis target users to a user of the relevance analysis device.

* * * * *